US007163459B2

(12) United States Patent
Tanskanen

(10) Patent No.: US 7,163,459 B2
(45) Date of Patent: Jan. 16, 2007

(54) MOBILE LOTTERY GAMES OVER A WIRELESS NETWORK

(75) Inventor: Erkki Tanskanen, Vantaa (FI)

(73) Assignee: Nokia Corportion, Espoo (FI)

( * ) Notice: Subject to any disclaimer, the term of this patent is extended or adjusted under 35 U.S.C. 154(b) by 0 days.

(21) Appl. No.: 10/092,209

(22) Filed: Mar. 6, 2002

(65) Prior Publication Data

US 2002/0151344 A1 Oct. 17, 2002

Related U.S. Application Data

(62) Division of application No. 09/835,190, filed on Apr. 14, 2001, now abandoned.

(51) Int. Cl.
*A63F 13/00* (2006.01)

(52) U.S. Cl. ........................................................ 463/17

(58) Field of Classification Search .................. 463/16, 463/17–22, 25, 29, 30, 37, 39, 40–42, 43; 273/138.1, 139, 138.2, 237, 269
See application file for complete search history.

(56) References Cited

U.S. PATENT DOCUMENTS

| | | | | |
|---|---|---|---|---|
| 4,845,739 | A | 7/1989 | Katz | |
| 5,108,115 | A | 4/1992 | Berman et al. | |
| 5,569,082 | A | 10/1996 | Kaye | |
| 5,800,268 | A | 9/1998 | Molnick | |
| 5,816,919 | A * | 10/1998 | Scagnelli et al. | 463/25 |
| 5,871,398 | A * | 2/1999 | Schneier et al. | 463/16 |
| 6,089,982 | A * | 7/2000 | Holch et al. | 463/42 |
| 6,146,272 | A * | 11/2000 | Walker et al. | 463/17 |
| 6,149,156 | A * | 11/2000 | Feola | 273/292 |
| 6,168,521 | B1 * | 1/2001 | Luciano et al. | 463/18 |
| 6,203,427 | B1 * | 3/2001 | Walker et al. | 463/16 |
| 6,475,089 | B1 | 11/2002 | Lee | |
| 6,488,280 | B1 | 12/2002 | Katz et al. | |
| 6,565,084 | B1 | 5/2003 | Katz et al. | |
| 2003/0060257 | A1 | 3/2003 | Katz et al. | |

FOREIGN PATENT DOCUMENTS

| | | |
|---|---|---|
| WO | WO 95/24689 | 9/1995 |
| WO | WO 96/00950 | 1/1996 |
| WO | WO 97/01145 | 1/1997 |
| WO | WO 97/02073 | 1/1997 |
| WO | WO 97/02074 | 1/1997 |
| WO | WO 98/29793 | 7/1998 |
| WO | WO 98/40141 | 9/1998 |
| WO | WO 98/43215 | 10/1998 |
| WO | WO 98/47115 | 10/1998 |
| WO | WO 99/00164 | 1/1999 |
| WO | WO 99/11008 | 3/1999 |
| WO | WO 00/39761 | 7/2000 |

* cited by examiner

*Primary Examiner*—Kim Nguyen
(74) *Attorney, Agent, or Firm*—Banner & Witcoff, Ltd.

(57) ABSTRACT

A method and system for providing real time scratch-off lottery like games over a wireless network. The method and system allow a user of a wireless station to play a lottery game electronically with the feel of real-time scratch and win determination. Substantially concurrently, security, including win/loss determination is maintained by a betting service provider on a system apart from the wireless station of the user. The system tracks user accounts, outstanding lottery games, and randomly determines win/loss information. The user is notified of win or loss (or the value "underneath" the scratch-off block in near real time. The wireless station transmits minimal amounts of data, typically a lottery ticket identifier and description of the users actions to the betting service provider and receives a value to display from the betting service provider.

34 Claims, 2 Drawing Sheets

FIG. 1
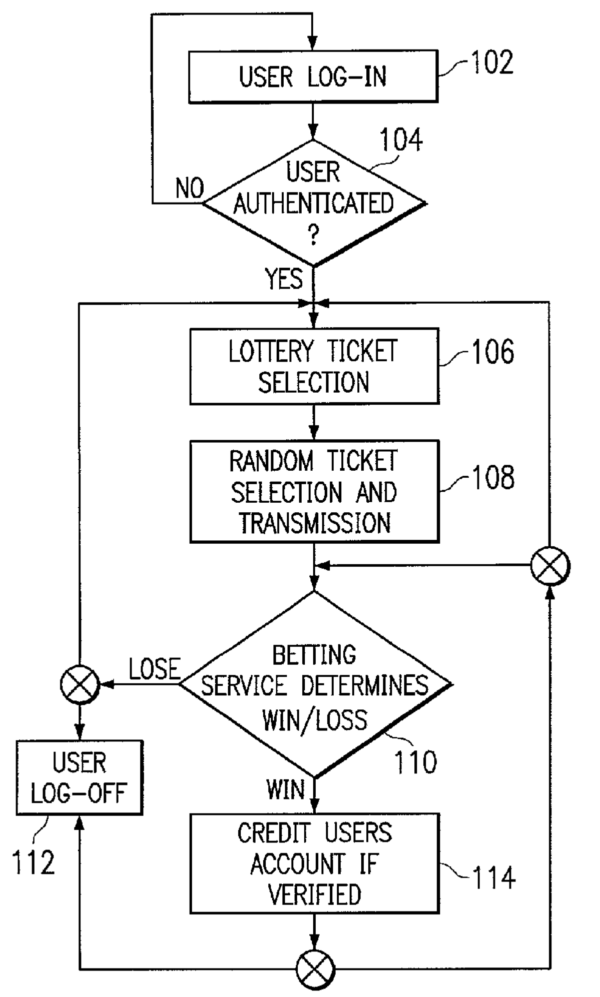
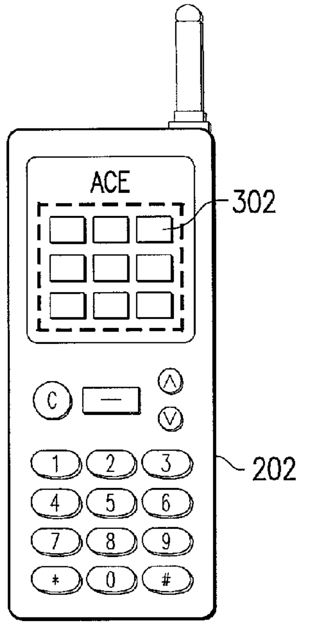
FIG. 3A
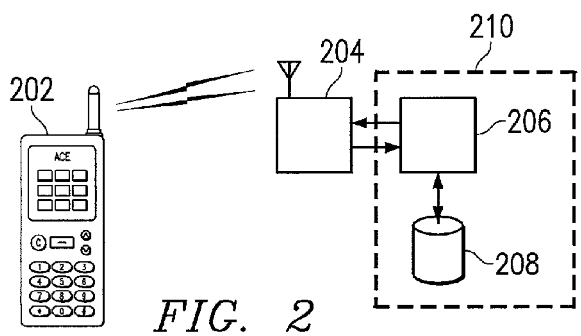
FIG. 2
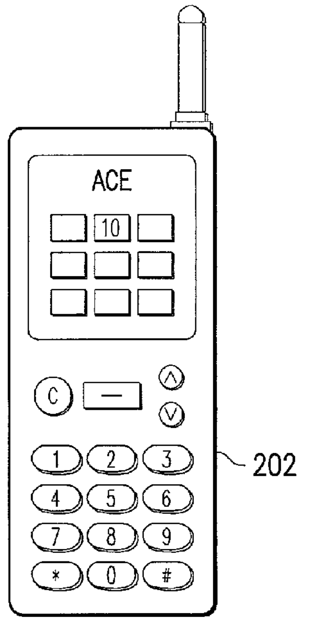
FIG. 3B

MOBILE LOTTERY GAMES OVER A WIRELESS NETWORK

CROSS REFERENCE TO RELATED APPLICATION

This application is a divisional of U.S. patent application Ser. No. 09/835,190 filed on Apr. 14,2001, now abandoned claiming priority from U.S. patent application Ser. No. 09/470,824 filed on Dec. 23,1999, now abandoned.

FIELD OF THE INVENTION

This invention relates to gaming entertainment and, more particularly, to providing real time lotto-type games in an interactive wireless environment.

BACKGROUND OF THE INVENTION

During the last few decades, same-time-same-place gambling has been complemented by same-time-different-place activities. Telephone betting has a long history that includes activities that have been proscribed (e.g., starting price or S.P. bookies), that have been approved (e.g., on-course bookies), and, in some countries, that have been State-conducted (e.g., phone-betting with State Government Totalisator Agency Boards or TABs).

It has long since been recognized that the virtualization of gambling could result in major changes to society. Whereas in 1975 few people might have contemplated a future in which bets could be placed on which member of the British Royal Family would die next, or on which state would next erupt in civil war, such bets can now be placed in the United Kingdom and in several other nations around the world. Betting houses offering such services are becoming readily accessible on the Internet.

Gambling is increasingly becoming a major feature of interactive networks. So much so, it appears to be one of the largest sources of revenue generation on the Internet. Use of the Internet for gambling is especially significant because it is fully operational, it uses an existing and pervasive infrastructure, and its market reach is already very wide. In addition to its physical advantages the growth rate of the Internet is dramatic and it is intrinsically extra-, and even supra-jurisdictional, making it extremely resistant to existing regulatory frameworks.

Satellite and cable infrastructures may be used to operate services independent from the Internet. It is important to note, however, that they are also entirely capable of being used as carrier mechanisms for Internet traffic, and indeed to support both proprietary and Internet channels at the same time. If satellite and/or cable come to supplant the public switched telephone network (PSTN) carried Internet, it will not necessarily supplant the Internet itself.

With particular regard to betting, real-time betting is quite difficult to carry out in a way that, allows the remoteness of the activity to be transparent o the user. That is, current real-time betting systems do not create an environment for a user that emulates the timing, and sensation, of carrying out a live, on location activity. Further, the real-time betting systems that do exist are not intuitive or easy to use by a majority of bettors.

SUMMARY OF THE INVENTION

The disclosed embodiments provide a method and system for providing real time scratch-off lottery like games over a wireless network. The method and system allow a user of a wireless station to play a lottery game electronically with the feel of real-time scratch and win determination. Substantially concurrently, security, including win/loss determination is maintained by a betting service provider on a system apart from the wireless station of the user. The system tracks user accounts, outstanding lottery games, and randomly determines win/loss information. The user is notified of win or loss (or the value "underneath" the scratch-off block in near real time. The wireless station transmits minimal amounts of data, typically a lottery ticket identifier and description of the users actions to the betting service provider and receives a value to display from the betting service provider.

The disclosed innovations provide several advantages. For example, the security of the win/loss information is maintained by the betting service provider. Moreover, in the presently preferred embodiment, the win/loss determination is not made until a button is pressed. Therefore, unlike a physical scratch-off lottery ticket, there is no a priori knowledge of the value of any ticket in the game. For another example, the user experiences real-time betting in a location remote from the betting service provider. This remote location aspect allows the gaming to occur at anytime and anywhere. For another example, betting losses can be controlled by managing the account of a user electronically. For another example, the disclosed embodiment prevents against a sell-out situation. Such a situation can occur with paper tickets when a particular game in popular. For another example, if the user wins on a particular ticket, the value of the win is credited to an account instantaneously. This instantaneous crediting eliminates the need for a player to go to a physical location to collect the winnings. It also eliminates the need to track a winning paper ticket. For another example, unlike paper lottery tickets, the winning tickets are not determined a priori and are not separately printed and mixed in with other tickets. Therefore, it is not possible to predict winning tickets based on print time or position.

BRIEF DESCRIPTION OF THE DRAWINGS

The disclosed inventions will be described with reference to the accompanying drawings, which show important sample embodiments of the invention, wherein:

FIG. 1 depicts a flow chart of the presently preferred embodiment;

FIG. 2 depicts a block diagram of connections and communication flow between the wireless station user and the betting service;

FIGS. 3A and 3B depict a possible configuration of the game of the presently preferred embodiment.

DETAILED DESCRIPTION OF THE PREFERRED EMBODIMENTS

Figure 4:
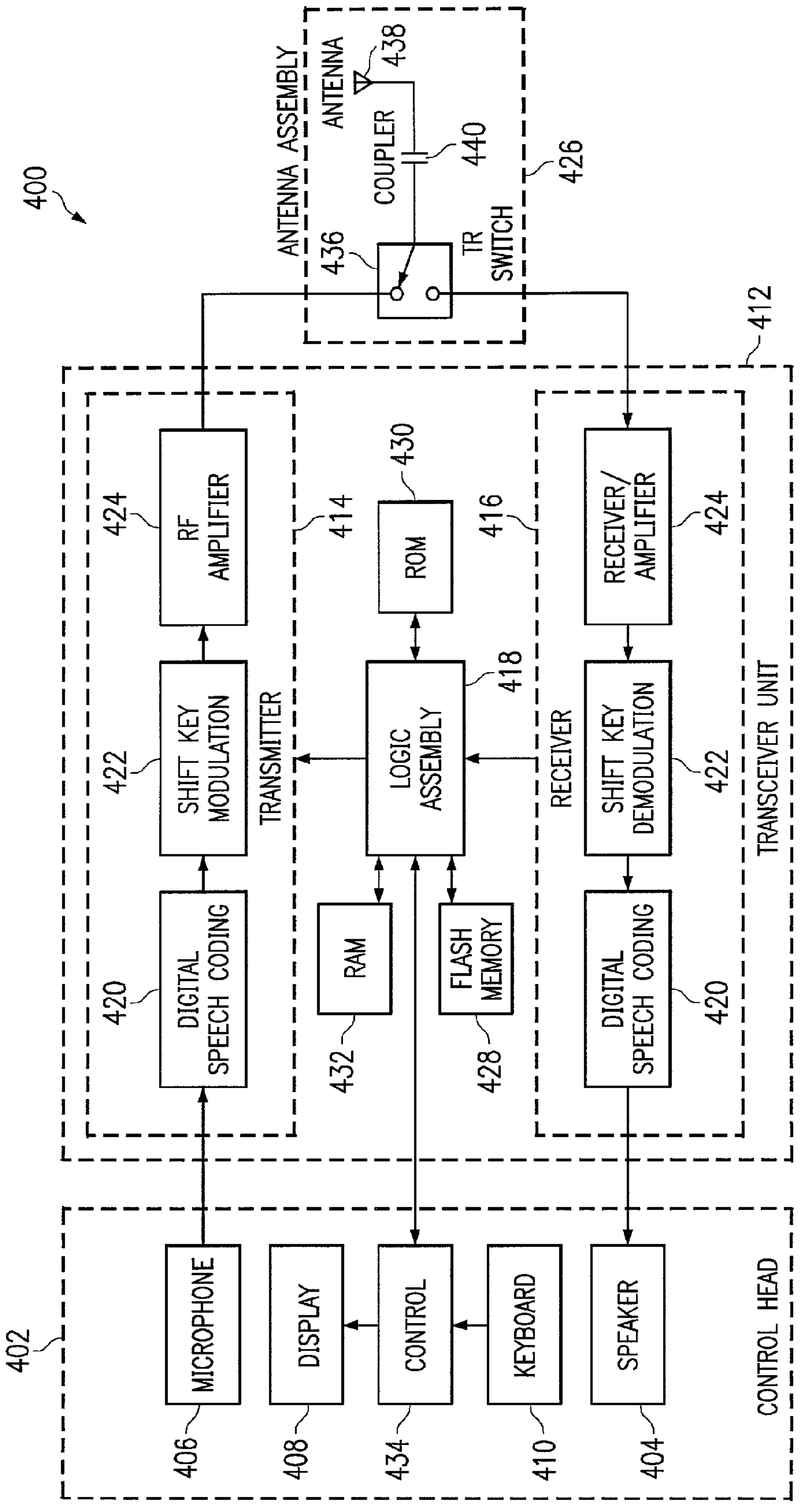
FIG. 4 depicts a block diagram of a wireless station that can make use of the disclosed embodiments.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The presently preferred embodiment of the disclosed innovations is a scratch-off lottery ticket-like game. However, it should be noted that the disclosed innovations can be implemented in a variety of ways in a wireless network.

FIG. 1 depicts a flow chart of the presently preferred embodiment. In FIG. 1, a wireless station user logs onto an electronic betting service (Step 102). A user authentication routine is executed by the betting service (Step 104). Once the user is authenticated, a choice of electronic lottery ticket-like games is presented and the user selects one or more "tickets" (Step 106). Once a selection is made, the betting service randomly selects game tickets and transmits them to the user (Step 108). Typically, a debit for each ticket selected will be taken from the betting service account of the user. Each game ticket has a lottery ID number associated with it that identifies it to the betting service. The lottery ID number is transmitted to the user along with the parameters of the game. The parameters can include, for example, the button array, game rules, ticket display layout, etc. Once received by the user, the game ticket can be played on a wireless station. In the presently preferred embodiment, the game is presented as an electronic representation of a scratchoff-type lottery ticket. Game play is described in further detail below. A determination of winning or losing is made as the user plays the game (Step 110). If the user has lost, the user may play another ticket, select another game or quit playing and log-off the betting service (Step 112). If the user wins the lottery game, the designated prize, for example, a certain amount of money, is credited to the betting service account of the user (Step 114). The credit to the user can also be made in the form of the issue of new lottery game tickets (with or without additional credit to the users account). The user may then play another selected ticket (Step 110), select another ticket (Step 106), or log-off the betting service (Step 112).

FIG. 2 depicts a block diagram of connections and communication flow between the wireless station user and the betting service. In the presently preferred embodiment, transmissions take place over the air. A wireless station 202 and a base station 204 make up the over-the-air transmission network. No particular over-the-air transmission system is required, for example, the system could be a TDMA, CDMA, GSM, GPRS, UMTS, AMPS, Bluetooth, WLAN, or other system. The wireless station 202 provides the necessary firmware, hardware, and display to enable playing the selected game. In the presently preferred embodiment, the wireless station 202 is the game terminal. The wireless station communicates with a betting service provider 210. In the presently preferred embodiment, the betting service provider 210 delivers betting services to the wireless station 202 via the base station 204 over an IP type connection. That is, the base station 204 is connected to the Internet or another IP based network. Data is delivered from the betting service provider 210 to the base station 204 over the network. The base station 204 then delivers the data to the wireless station 202 over-the-air. Of course, data delivery is not dependent on a network running IP. Other network protocols, for example, X.25, X.400, etc. can be used. Moreover, the betting service provider 210 may be WAP (Wireless Application Protocol) enabled such that it delivers the game in a more user-friendly format.

In the presently preferred embodiment, the betting service provider 210 is a server 206 connected to a network which is accessible by the base station 204. The server 206 receives communications from the wireless station e.g., 202 wishing to purchase and execute electronic betting games, such as the lottery-type game of the present application. For example, user log-on and lottery ticket selection (Steps 102 and 106) require communication between the server and the wireless station. The server 206 executes one or more programs to manage the accounts of users registered to play such games. Additionally, the server 206 executes one or more programs to distribute the games to various wireless stations e.g., 202. In the presently preferred embodiment, user account management and game distribution are tracked using at least one database 208. The credits and debits and current total in the account of a user as well as log-in authentication information are kept in the database.

The betting service provider 210 must also maintain information on the types of games available for lottery selection. Once a game is selected by a user and transmitted to a wireless station e.g., 202, the server 206 must track the lottery ID number. Such tracking can include linking the lottery ID number to a specific user to verify that a win is being reported by the user who purchased the game (or the wireless station to which the game transmitted). In addition, the betting service provider 210 must maintain the randomness and fairness of the games being played.

FIGS. 3A and 3B depict a possible configuration of the game of the presently preferred embodiment. The betting service provider 210 will provide the wireless station 202 with the data needed to play the game. The data includes the lottery ID number and a button set. The betting service provider tracks the lottery ID number and the button set. The example depicted in FIGS. 3A and 3B is a lottery game called Ace. If Ace is selected as a lottery ticket in Step 106, a display similar that depicted in FIG. 3A appears on the wireless station 202. The nine blocks 302 in the display are the equivalent of the opaque scratch-off squares of a paper lottery ticket. Each block is linked to a corresponding button of the wireless station 202. The top left block, for example, is linked to the button, or key, labeled "1" and the bottom right block, for example, is linked to the button labeled "9". Although there can be many different electronic lottery games, just as there are many different paper lottery games; the linking of the opaque blocks of each game to a key of a wireless station 202 is typical. The game is played by touching a button of the wireless station which is linked to a block of the game. Once a button is selected, the wireless station transmits the lottery ID number and the selected button to the betting service provider 210. The betting service provider 210 matches the button selected for the lottery ID number to a value. The value, which can be a dollar amount or even a "WIN" or "NO WIN" display, is chosen and communicated back to the wireless station 202. Such a action is equivalent to scratching off the coating of a block on a paper lottery ticket to reveal a picture, or other display underneath.

FIG. 3B depicts the Ace game after having been played. The button selected corresponds to, for example, the button labeled "2". Once selected, the display "underneath" the opaque block corresponding to the chosen button is revealed.

Of course, the game Ace is only an example of the many different scratch-off type games that can be played on the wireless station 202. For example, a scratch-off game in which three buttons are selected and the values "underneath" the three must match to win can also be played on the wireless station 202. However, each game is exemplified by the use of the betting service provider 210 in mapping buttons to values to be displayed. The betting service provider 210 is responsible for the randomness and fairness of the betting activity. The game, as it exists on the wireless station 202, does not contain the information needed to determine win or loss. The betting service provider 210 makes the win/loss determination. In the presently preferred embodiment, the betting service provider 210 receives a lottery ID number and the selected button from the wireless station 202. The betting service provider then randomly generates a value. The value, for example, can be an amount of money or a "NO WIN". In this manner, the security of the game is enhanced. Once generated, the betting service provider 210 transmits the value to the wireless station 202. The value received at the wireless station is then displayed in the block corresponding to the selected button.

From the perspective of the user, the game, as it is played on the wireless station 202, is self contained. That is, the user perceives the game as though it is an electronic scratch-off ticket. Ideally, the data transmission between the wireless station 202 and the betting service provider 210 is not significantly delayed, enabling the display to appear to respond to the selection of button in apparent real-time.

In an alternative embodiment, each game ticket downloaded to a wireless station, or other terminal, for playing includes the win/loss information. That is, in addition to the lottery ID number and game parameters, information regarding the value behind the button or buttons selected, is known or derived at the wireless station. In this alternative embodiment, the betting service provider 210 no longer generates random values after a button is selected. Rather, the betting service provider 210 generates random values prior to transmitting the ticket and transmits them with the other game parameters. The betting service provider 210 serves to verify that the buttons selected for the particular lottery ID number would result in a winning ticket and properly credit a users account. Of course, given appropriate security measures, the wireless station 202, instead of the betting service provider, can be enabled to generate the random values associated with the buttons of the lottery game.

FIG. 4 depicts a block diagram of a wireless station, or mobile station, 400 that can make use of the disclosed embodiments. The mobile station 400 includes, in this example:

A control head 402 containing an audio interface, i.e. a speaker 404 and microphone 406.The control head 402 generally includes a display assembly 408 allowing a user to see dialed digits, stored information, messages, calling status information, including signal strength, etc. The control head generally includes a keypad 410, or other user control device, allowing a user to dial numbers, answer incoming calls, enter stored information, and perform other mobile station functions. The control head also has a controller unit 434 that interfaces with a logic control assembly 418 responsible, from the control unit perspective, for receiving commands from the keypad 410 or other control devices, and providing status information, alerts, and other information to the display assembly 408;

A transceiver unit 412 containing a transmitter unit 414, a receiver unit 416, and the logic control assembly 418. The transmitter unit 414 converts low-level audio signals from the microphone 406 to digital coding using a codec (a data coder/decoder) 420. The digitally encoded audio is represented by modulated shifts, for example, in the frequency domain, using a shift key modulator/demodulator 422. Other codes transmission utilized by the logic control assembly 418, such as station parameters and control information, may also be encoded for transmission. The modulated signal is then amplified 424 and transmitted via an antenna assembly 426;

The antenna assembly 426 contains a TR (transmitter/receiver) switch 436 to prevent simultaneous reception and transmission of a signal by the mobile station 400. The transceiver unit 412 is connected to the antenna assembly 426 through the TR switch 436. The antenna assembly contains at least one antenna 438;

The receiver unit 416 receives a transmitted signal via the antenna assembly 426. The signal is amplified 424 and demodulated 422. If the signal is an audio signal, it is decoded using the codec 420. The audio signal is then reproduced by the speaker 404. Other signals are handled by the logic control assembly 418 after demodulation 422; and A logic control assembly 418 usually containing an application specific integrated circuit (or ASIC) combining many functions, such as a general purpose microprocessor, digital signal processor, and other functions, into one integrated circuit. The logic control assembly 418 coordinates the overall operation of the transmitter and receiver using control messages. Generally, the logic control assembly operates from a program that is stored in flash memory 428 of the mobile station. Flash memory 428 allows upgrading of operating software, software correction or addition of new features. Flash memory 428 is also used to hold user information such as speed dialing names and stored numbers. The various disclosed embodiments typically function from this or another section of the mobile station's memory. In the presently preferred embodiment, the display 408 and keypad 410 of the wireless station are used to play the game.

In addition to flash memory 428, the mobile station will typically contain read only memory (ROM) 430 for storing information that should not change, such as startup procedures, and random access memory (RAM) 432 to hold temporary information such as channel number and system identifier.

As will be recognized by those skilled in the art, the innovative concepts described in the present application can be modified and varied over a tremendous range of applications, and accordingly the scope of patented subject matter is not limited by any of the specific exemplary teachings given.

For example, the betting service provider is described as determining the win/loss of the lottery ticket after a button is selected. However, it is possible that all of the buttons associated with the game are mapped to values prior to the transmission of the game. Moreover, the values could be mapped after transmission but before reception of the selected button.

For another example, while the presently preferred embodiment of the disclosed innovations is described as communications over the air. Such innovations can be delivered over any type of network, wireless or wired. Terminals connected to a network, e.g., the Internet, through phone lines or other physical connections can make use of the disclosed innovations.

For another example, the location of the wireless station can be used, via GPS, Bluetooth, or another location system, to provide a selection of tickets, or games, with a theme associated with the location. As an example of a theme, if a ticket is to be played in a hockey arena, the selection of games (and their associated parameters) would be keyed to hockey e.g., "Blue Line", "Face-Off", etc.

For another example, in wireless stations that are enabled with communications facilities other than radio frequency, e.g., infra-red, the ticket and game parameters can be transmitted to the wireless station from other than a radio frequency wireless network.

For another example, the lottery game can be purchased at a known geographic location designed for such purchases. For example, a night club or other entertainment center, such as the hockey arena scenario described above, may be equipped to vend the games. The games could be transmitted over radio frequency, infra-red, or downloaded via a physical interface. In confined spaces, a low-power radio frequency, such as that provided by Bluetooth or WLAN could be used. Win values could be redeemed at the location instead of receiving electronic credit to a user account.

What is claimed is:

1. A method of providing electronic lottery games comprising the steps of:

transmitting a game identification number over a wireless network from a betting service to said wireless game terminal having a display;

transmitting a plurality of game parameters associated with said game identification number over said wireless network to said wireless game terminal, wherein the game parameters include instructions for:

causing the display to present a plurality of graphic objects;

allowing the reception of a user selection of one of said objects;

causing said display to replace said selected object with a second graphic object, wherein said second graphic object is different from said selected object; and transmitting data related to the selection to said betting service;

receiving at said betting service said data related to selections on said wireless game terminal associated with said game identification number;

calculating a win/loss value at said electronic betting service; and transmitting said win/loss value to said wireless game terminal.

2. The method of claim 1, further comprising the step of transmitting a selection of possible games wherein said game identification number and said plurality of game parameters are associated with the game selected from said possible games.

3. The method of claim 1, further comprising the step of crediting an account when said win/loss value is a positive value.

4. The method of claim 1, wherein said calculating step occurs after said receiving step.

5. The method of claim 1, wherein said calculating step is performed for each possible selection associated with said game identification number.

6. The method of claim 1, further comprising the step of storing information associated with said game identification number on a database.

7. The method of claim 1, wherein a user must purchase the lottery game before receiving the game identification number and the win/loss value transmitted to the wireless game terminal indicates the user won the game, the method further comprising the steps of:

linking the game identification number to the user of the wireless game terminal who purchased the game; and comparing the game identification number to the user playing the game to verify if the user playing the game is the same user that purchased the game.

8. A method comprising the steps of:

accepting a lottery game selection from a wireless network;

receiving a game identification number and a plurality of game parameters associated with said game identification number from said wireless network at a wireless game terminal having a display, wherein said plurality of game parameters include instructions for:

causing the display to present plurality of graphic objects;

allowing the reception of a user selection of one of said objects;

causing said display to replace said selected object with a second graphic object, wherein said second graphic object is different from said selected object; and transmitting data related to the selection to said betting service;

accepting at least one gaming selection from said wireless network according to the rules of said selected lottery game; and receiving win/loss value information from said wireless network based on said at least one gaming selection.

9. The method of claim 8, further comprising the step of logging on to said wireless network to receive a selection of lottery games.

10. The method of claim 8, further comprising the step of crediting an account when said win/loss value is a positive value.

11. The method of claim 8, further comprising the step of storing information about said at least one gaming selection on a database.

12. The method of claim 8, further comprising the step of calculating a win/loss value for said selected game.

13. The method of claim 8, further comprising the step of calculating a win/loss value for each possible gaming selection of said selected game.

14. The method of claim 8, wherein all of said steps are in the form of instructions embodied in a carrier wave sent over the said wireless network to instruct said wireless game terminal to perform all of said steps.

15. The method of claim 8, wherein all of said steps are in the form of instructions embodied in a flash memory to instruct said wireless game terminal to perform all of said steps.

16. The method of claim 8, wherein said graphic objects in said plurality of graphic objects are substantially identical relative to each other.

17. The method of claim 16, wherein said graphic objects are block-shaped.

18. The method of claim 8, wherein said second graphic object is a numeral.

19. The method of claim 8, wherein a user must purchase the lottery game before receiving the game identification number and the win/loss value received at the wireless game terminal indicates the user won the game, the method further comprising the steps of:

linking the game identification number to the user of the wireless game terminal who purchased the game; and comparing the game identification number to the user playing the game to verify if the user playing the game is the same user that purchased the game.

20. An interactive services display and response system for providing games over a wireless network, comprising:

a betting service provider on said wireless network; and a wireless game terminal connected to said wireless network to communicate with said betting service provider over said wireless network;

wherein said betting service provider is configured to transmit a game identification number over said wireless network to said wireless game terminal, transmit a plurality of game parameters associated with said game identification number to said wireless game terminal, receive data related to selections on said wireless game terminal associated with said game identification number, calculate a win/loss value, and transmit said win/loss value to said wireless game terminal; and wherein said game parameters include instructions for:

causing a display to present plurality of graphic objects;

allowing the reception of a user selection of one of said objects;

causing said display to replace said selected object with a second graphic object, wherein said second graphic object is different from said selected object; and transmitting data related to the selection to said betting service.

21. The system of claim 20, wherein said betting service provider is further configured to transmit a selection of possible games, and wherein said game identification number and said plurality of game parameters are associated with the game selected from said possible games.

22. The system of claim 20, wherein said betting service provider is further configured to credit an account when said win/loss value is a positive value.

23. The system of claim 20, wherein said betting service provider is further configured to calculate a win/loss value for each possible selection associated with said game identification number.

24. The system of claim 20, further comprising a database which stores information associated with said game identification number.

25. The system of claim 20, wherein said wireless game terminal is further configured to log on to said wireless network to receive a selection of lottery games.

26. The system of claim 20, wherein said wireless game terminal is further configured to credit an account when said win/loss value is a positive value.

27. The system of claim 20, wherein said wireless game terminal is further configured to calculate a win/loss value for said at least one gaming selection.

28. The system of claim 20, wherein said instructions are embodied in a flash memory to instruct said wireless game terminal to perform all of said steps.

29. The system of claim 20, wherein said graphic objects in said plurality of graphic objects are substantially identical relative to each other.

30. The system of claim 29, wherein said graphic objects are block-shaped.

31. The system of claim 20, wherein said second graphic object is a numeral.

32. The system of claim 20, wherein a user must purchase the lottery game before receiving the game identification number and the win/loss value transmitted to the wireless game terminal indicates the user won the game, the system further comprising the steps of:

linking the game identification number to the user of the wireless game terminal who purchased the game; and comparing the game identification number to the user playing the game to verify if the user playing the game is the same user that purchased the game.

33. A wireless user terminal having a computer-readable medium having computer readable instructions thereon that when executed allow the terminal to perform a method comprising the steps of:

receiving a game identification number over a wireless network from a betting service;

receiving a plurality of game parameters associated with said game identification number over said wireless network to said wireless user terminal, wherein the game parameters include instructions for:

causing a display of the wireless user terminal to present plurality of graphic objects;

allowing the reception of a user selection of one of said objects;

causing said display to replace said selected object with a second graphic object, wherein said second graphic object is different from said selected object; and transmitting data related to the selection to said betting service;

transmitting said betting service said data related to user selections on said wireless user terminal associated with said game identification number; and receiving win/loss value at said wireless user terminal.

34. A betting service server having a computer-readable medium having computer readable instructions thereon that when executed perform a method comprising the steps of:

transmitting a game identification number over a wireless network from a betting service server to a wireless game terminal;

transmitting a plurality of game parameters associated with said game identification number over said wireless network to said wireless game terminal, wherein the game parameters include instructions for:

causing a display of the wireless game terminal to present plurality of graphic objects; allowing the reception of a user selection of one of said objects;

causing said display to replace said selected object with a second graphic object, wherein said second graphic object is different from said selected object; and transmitting data related to the selection to said betting service;

receiving at said betting service server said data related to selections on said wireless game terminal associated with said game identification number;

calculating a win/loss value at said betting service server; and transmitting said win/loss value to said wireless user terminal.

* * * * *

UNITED STATES PATENT AND TRADEMARK OFFICE

CERTIFICATE OF CORRECTION

PATENT NO. : 7,163,459 B2
APPLICATION NO. : 10/092209
DATED : January 16, 2007
INVENTOR(S) : Erkki Tanskanen It is certified that error appears in the above-identified patent and that said Letters Patent is hereby corrected as shown below:

On the cover page, Related U.S. Applications Data section (62):

Please replace "now abandoned." with --now abandoned, claiming priority from United States Patent Application Number 09/470,824 filed on December 23, 1999, now abandoned.--

Signed and Sealed this

Twenty-fourth Day of July, 2007

JON W. DUDAS

*Director of the United States Patent and Trademark Office*